US010524045B2

(12) United States Patent
Richard

(10) Patent No.: US 10,524,045 B2
(45) Date of Patent: Dec. 31, 2019

(54) SOUND RECEIVER AND PERSONAL AUDIO SYSTEM HAVING THE SAME

(71) Applicants: Alwin Co., Ltd., Apia (WS); Chi-Hsueh Richard, San Jose, CA (US)

(72) Inventor: Chi-Hsueh Richard, San Jose, CA (US)

(73) Assignees: Chi-Hsueh Richard, San Jose; Alwin Co., Ltd., Apia (WS)

( * ) Notice: Subject to any disclaimer, the term of this patent is extended or adjusted under 35 U.S.C. 154(b) by 0 days.

(21) Appl. No.: 15/768,564

(22) PCT Filed: Oct. 20, 2016

(86) PCT No.: PCT/US2016/057779
§ 371 (c)(1),
(2) Date: Apr. 16, 2018

(87) PCT Pub. No.: WO2017/070261
PCT Pub. Date: Apr. 27, 2017

(65) Prior Publication Data
US 2018/0262830 A1    Sep. 13, 2018

Related U.S. Application Data

(60) Provisional application No. 62/243,945, filed on Oct. 20, 2015.

(51) Int. Cl.
*H04R 1/40* (2006.01)
*H04R 25/00* (2006.01)
*H04R 1/10* (2006.01)

(52) U.S. Cl.
CPC ........... *H04R 1/406* (2013.01); *H04R 25/402* (2013.01); *H04R 1/1008* (2013.01); *H04R 1/1016* (2013.01)

(58) Field of Classification Search
CPC ...... H04R 1/1016; H04R 5/033; H04R 3/005; H04R 1/406; H04R 1/1075; H04R 5/027;
(Continued)

(56) References Cited

U.S. PATENT DOCUMENTS 4,770,270 A     9/1988  Grimm
5,692,060 A *  11/1997  Wickstrom ............ H04R 1/342
                                                                   379/433.03
(Continued)

FOREIGN PATENT DOCUMENTS

CN     1802873 A     7/2006
CN     1953619 A     4/2007
(Continued)

*Primary Examiner* — Curtis A Kuntz
*Assistant Examiner* — Julie X Dang
(74) *Attorney, Agent, or Firm* — ScienBiziP, P.C.

(57) ABSTRACT

A personal audio system enabling a user to distinguish approximate locations of sound sources comprises at least one sound receiver. The sound receiver comprises a sound collecting structure for collecting sound. The sound collecting structure comprises a plurality of sound passages opening toward different directions and with different sizes to collect sound waves from the environment. The different sizes of the openings render a decline or an increase in specific frequency ranges of sound as a result of different resonances via the different openings. The user may therefore distinguish the direction of a sound source based on the slightly different pitches (frequencies) of the sound.

19 Claims, 16 Drawing Sheets

(58) Field of Classification Search
CPC ............... H04R 1/08; H04R 2201/401; H04R 2205/022; H04R 1/02; H04R 1/04; H04R 1/086; H04R 2201/403; H04S 2400/13; H04S 2420/03; H04S 2420/07; H04S 3/00; H04S 7/302; H04S 7/303; H04S 7/40; H04S 1/007; H04S 2420/01; H04S 3/004; H04S 7/304; G10L 2021/02165; G10L 21/0216; G10L 25/51
USPC ...... 381/356, 357, 358, 71.6, 355, 370, 380, 381/122, 310; 181/148, 152, 155, 160, 181/193; D14/434, 228, 225
See application file for complete search history.

(56) References Cited

U.S. PATENT DOCUMENTS

| | | | | |
|---|---|---|---|---|
| 5,987,147 A * | 11/1999 | Nishimoto | ............ | H04R 5/033 381/375 |
| 2004/0247146 A1 | 12/2004 | Killion et al. | | |
| 2013/0163799 A1 * | 6/2013 | Van Halteren | ......... | H04R 25/02 381/330 |
| 2014/0064544 A1 * | 3/2014 | Zukowski | .............. | H04R 1/086 381/360 |
| 2014/0270200 A1 * | 9/2014 | Usher | .................. | H04R 1/1041 381/57 |
| 2015/0010165 A1 * | 1/2015 | Peng | ........................ | H04R 3/02 381/93 |
| 2015/0164465 A1 | 6/2015 | Shan | | |

FOREIGN PATENT DOCUMENTS

| | | |
|---|---|---|
| CN | 1957639 A | 5/2007 |
| CN | 102132587 A | 7/2011 |
| JP | 2014158140 | 8/2004 |
| JP | 2005184422 | 7/2005 |

* cited by examiner

SOUND RECEIVER AND PERSONAL AUDIO SYSTEM HAVING THE SAME

CROSS-REFERENCE TO RELATED APPLICATIONS

This application is the National Stage of International Application No. PCT/US16/57779 filed on Oct. 20, 2016, which claims benefits of U.S. provisional application No. 62/243,945 filed on Oct. 20, 2015, the entirety of which are incorporated herein by reference.

FIELD

The present disclosure generally relates to a sound receiver and a personal audio system.

BACKGROUND

Hearing loss affects quality of life. It may be caused by aging, noise exposure, infections, physical trauma, neurological disorders, or congenital factors. To compensate for the loss of hearing acuity, various types of hearing aid devices or personal sound amplification devices have been developed to amplify sound for users, such as behind the ear aids, in the ear aids, or aids partially or completely in the ear canal. Conventional hearing aids do not provide locational information of sound, so a cocktail party is still a difficult environment for people suffering hearing loss.

Some conventional hearing aids may have two microphones paired with two speakers respectively at a user's left side and right side. The left microphone may collect sound from the users' left side, convert into electronic signals, and transmit to the left speaker. Similarly, the right microphone may collect sound from the users' right side, convert into electronic signals, and transmit to the right speaker. This configuration may enable the user to distinguish between sound from the left side and sound from the right side. However, such configuration does not enable the user to distinguish sounds from other directions such as the user's front and back.

Within present disclosure, solutions are provided, and not to be limited to the specific situations which are described.

BRIEF DESCRIPTION OF THE DRAWINGS

Embodiments of the present technology will now be described, by way of example only, with reference to the attached figures.

FIG. 513 is a hearing aid 300 as the personal audio system 900 for the scenario of FIG. 5A.

DETAILED DESCRIPTION

Figure 1A:
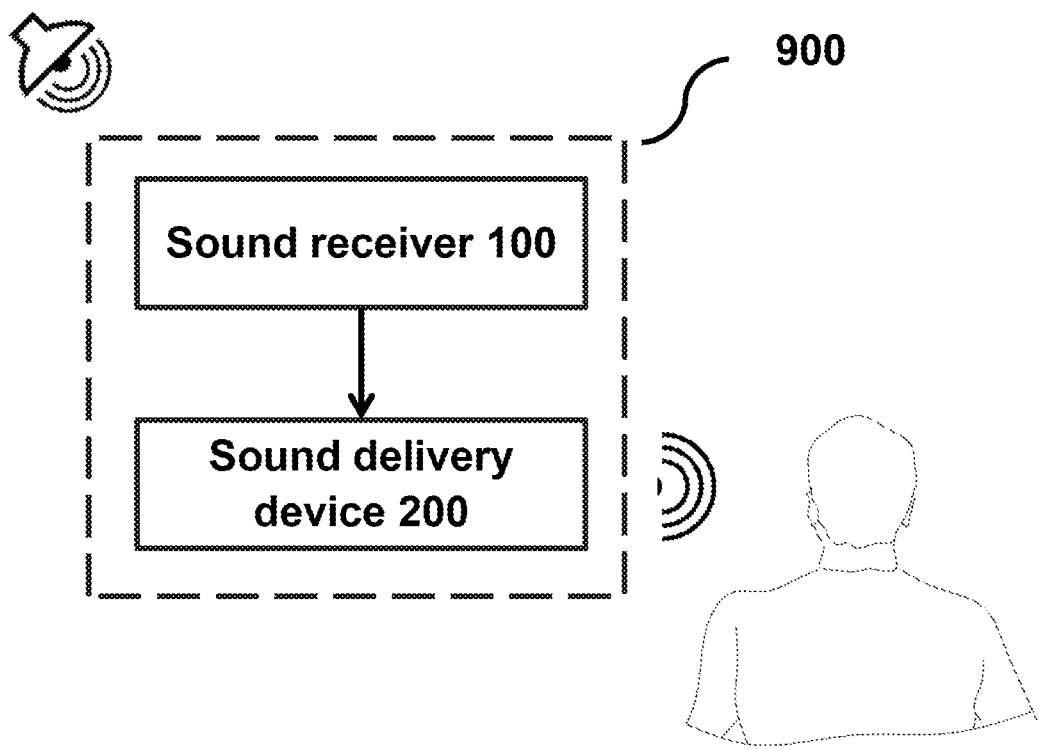
FIG. 1A shows functional diagrams illustrating a personal audio system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A personal audio system configured to receive audio signal and deliver sound to an individual is disclosed. In one embodiment, the personal audio system may comprise a sound receiver, a signal input unit, a signal switch unit, a signal processing unit, a coupling circuit, a transducer, a speaker, and a housing.

The sound receiver is configured to receive ambient sound and convert the sound into audio signal.

The signal input unit is configured to receive signal and convey the signal to other electronic components. A signal input unit may be a microphone, an audio port, or a wireless communication module. A microphone may be a condenser microphone, a ribbon microphone, a piezoelectric microphone, or a silicon microphone. An audio port may be a phone connector, a DIN connector, a BNC connector, an XLR connector, an RCA connector, or a TOSLINK connector. A wireless communication module is configured to receive wireless signals and convey the signals to successive components. The wireless communication module may be a BLUETOOTH module, a WI-FI module, or a ZIGBEE module.

The signal switch unit is configured to change the source of the signal input, or the mode of signal input. For example, a user may select a certain mode to receive the audio signal mainly from an audio port, or to receive the audio signal mainly from microphone. The signal switch unit may be an electromagnetic relay or an optical relay. The signal switch unit may also be integrated as a functional unit in a signal processing unit.

The signal processing unit is configured to receive audio signal from a signal input unit and may perform function for adequate sound delivery quality, such as mixing, amplifying, filtering, noise cancellation, phase shifting, or enhancement. The received audio signal may be analog electrical signals or digital electrical signals. A signal processing unit may comprise analogue processing components, for example, an operational amplifier, or digital processing components, for example, an audio processing integrated circuit. A signal processing unit may be an electrical circuit comprising operational amplifiers, capacitors, and transistors or may be integrated as a single packaged chip. Also, a signal processing unit may have mixing function to adequately mix the audio signals, for example, from both an audio port and a sound receiver. Furthermore, a signal processing unit may flip the audio signals transmitted to bilateral transducers, so that the left transducer receive the same signal as the right speaker, and the right transducer receive the same signal as the left speaker.

The speaker is configured to convert an electrical audio signal into a corresponding audible sound. The speaker may be a moving-coil speaker, an electrostatic speaker, an electret speaker, or an orthodynamic speaker.

The housing accommodates the components of a personal audio system or a sound delivery device, and provides a suitable wearable arrangement for user's head.

Figure 1B:
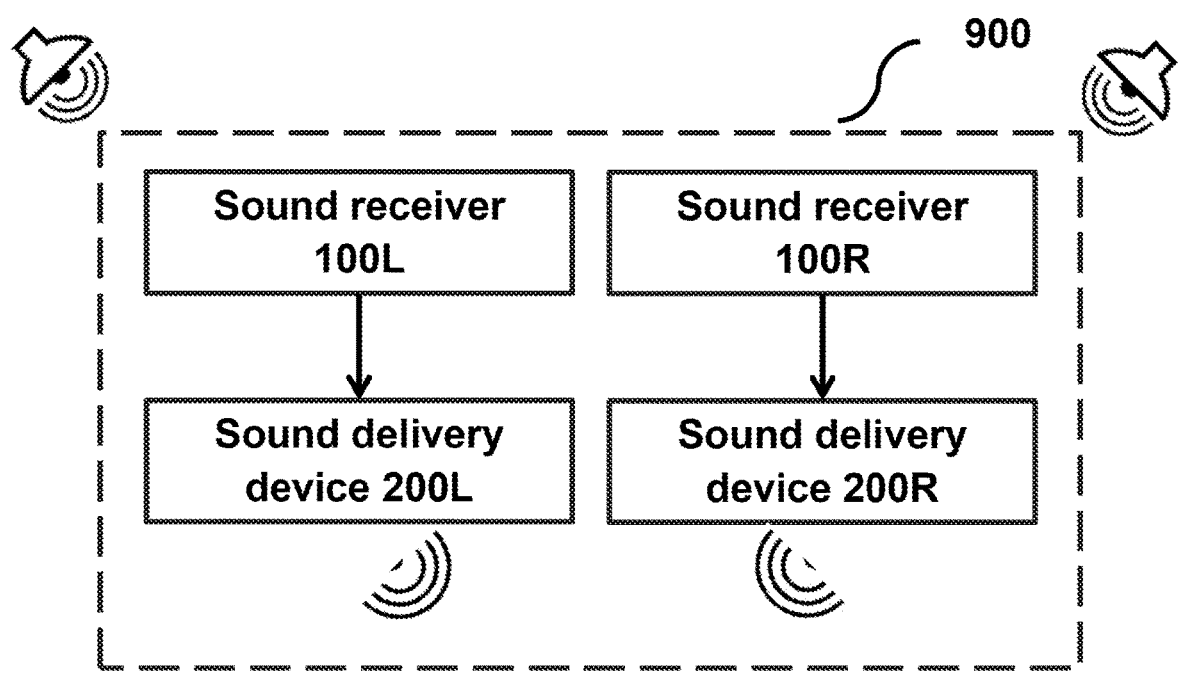
FIG. 1B shows functional diagrams illustrating a personal audio system having a pair of sound receivers and sound delivery devices of the present disclosure.
Figure 1C:
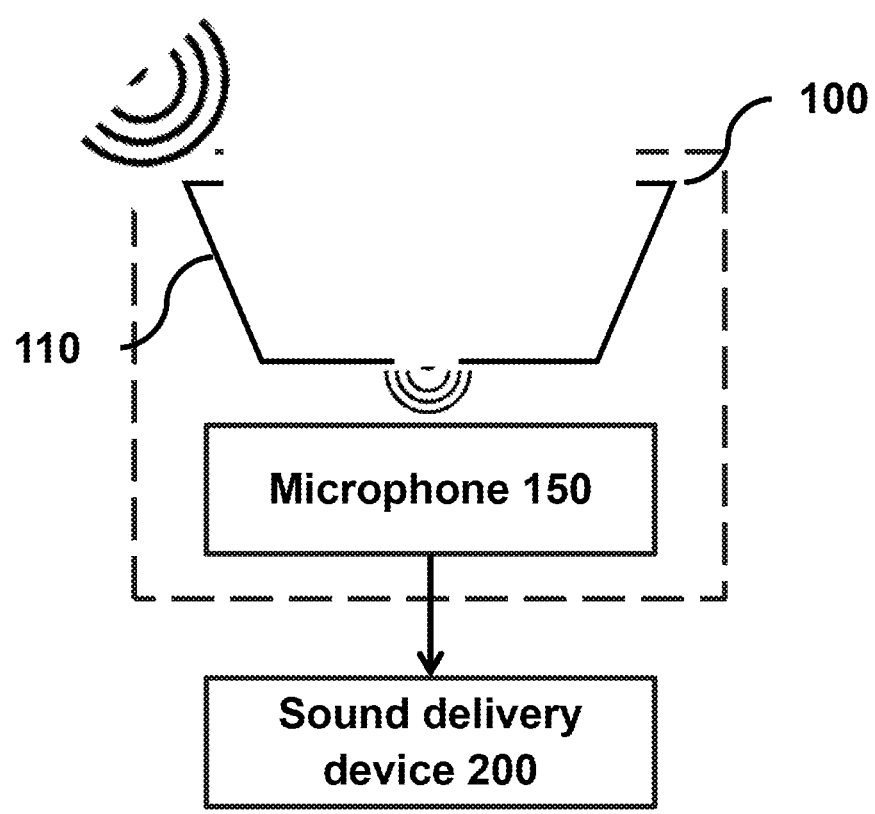
FIG. 1C is an illustration of a sound receiver of the present disclosure.

Referring to FIG. 1A, a personal audio system 900 enabling a user to distinguish location of sound sources is disclosed. The personal audio system 900 comprises at least one sound receiver 100 for collecting sound to convert into electronic signals and at least one sound delivery device 200 to generate to the user sound according to the electronic signals. In some embodiments, referring to FIG. 1B, the personal audio system may comprise a pair of sound receivers (100L, 100R) and sound delivery devices (200L, 200R) for each of the user's ears. Referring to FIG. 1C, the sound receiver 100 may comprise a sound collecting structure 110 for collecting sound from sound sources and a microphone 150 for converting sound into electronic signals.

Figure 1D:
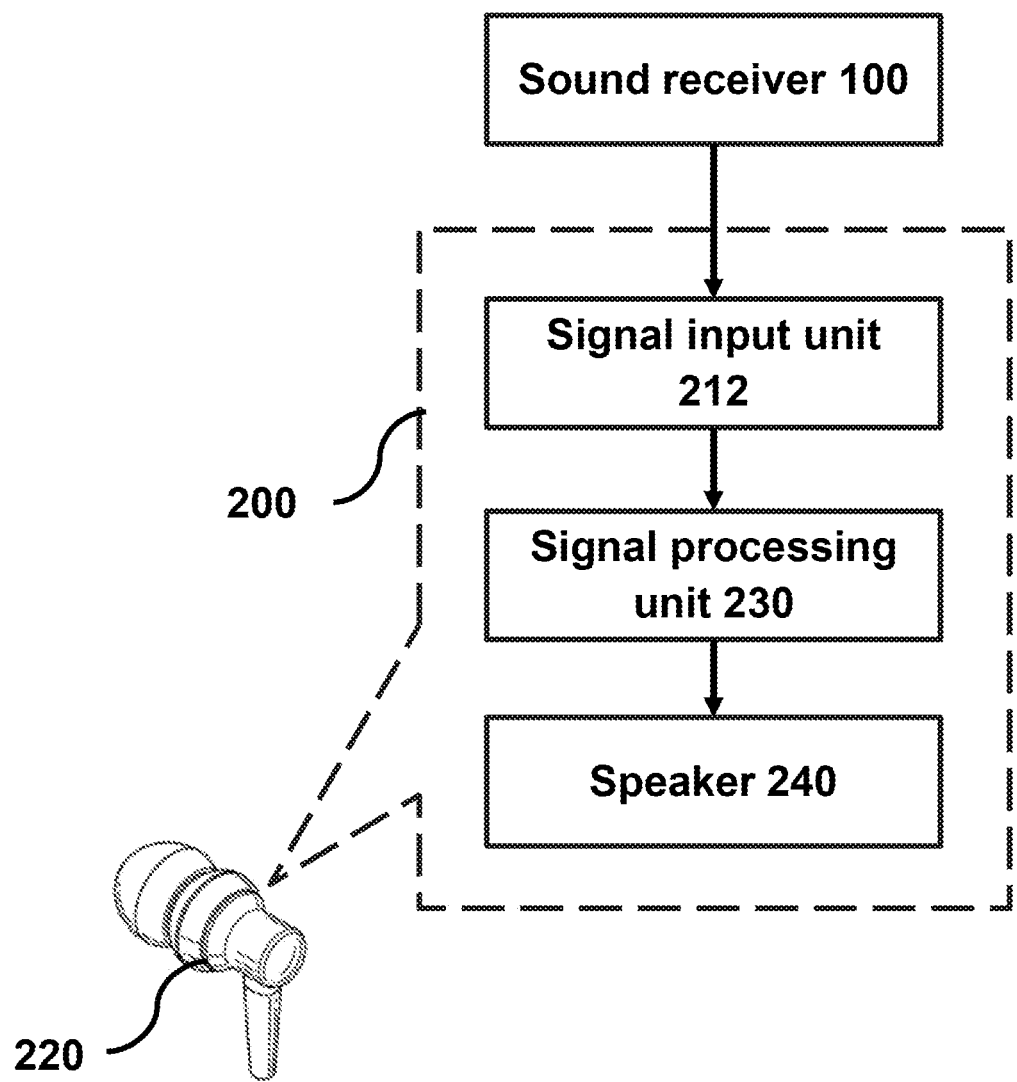
FIG. 1D is an illustration of a sound delivery device of the present disclosure.

Referring to FIG. 1D, in some embodiments, the microphone 150 may be connected to the sound delivery device 200 and transmit the electronic signals to the sound delivery device 200. The sound delivery device 200 may comprise a signal input unit 212 to receive the electronic signals, a signal processing unit 230 to filter noises in the electronic signals, a speaker 240 to regenerate the sound from the processed signal, and a housing 220 to accommodate the signal input unit 212, the signal processing unit 230, and the speaker 240. The housing 220 may be configured to be worn in or on or around the user's ear with the speaker 240 positioned near and toward the auricle and the external auditory canal.

Figure 2A:
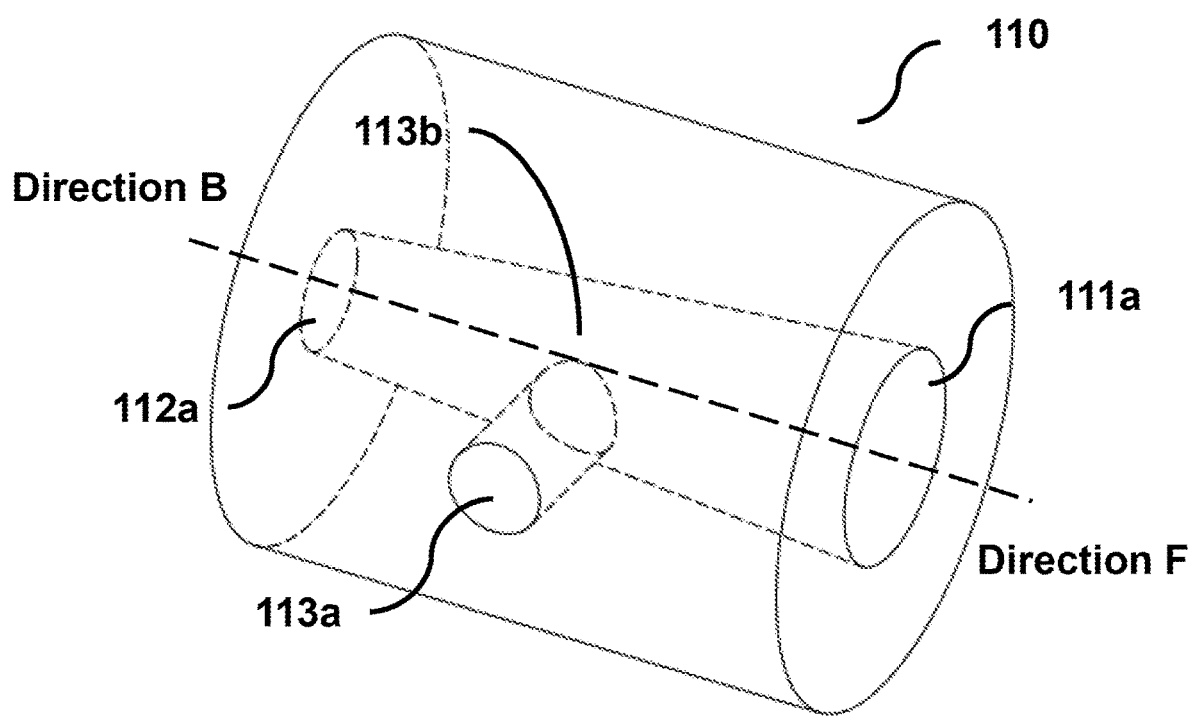
FIG. 2A is an illustration of the sound collecting structure 110 of the present disclosure.

Referring to FIG. 2A, an illustration of the sound collecting structure 110 is disclosed. Toward a first direction F, the sound collecting structure 110 comprises at least at a first opening 111a located at an surface of the sound collecting structure 110. Toward a substantially different second direction B, the sound collecting structure 110 also comprises at least a second opening 112a located at another outer surface of the sound collecting structure 110. In the present embodiment, the first direction F is substantially opposite to the second direction B. The sound collecting structure 110 also comprises a third opening 113a. In the embodiment shown in FIG. 2A, the third opening 113a is located at a peripheral surface of the sound collecting structure 110. Combining the abovementioned illustration presented in FIG. 1C, the third opening 113 faces the microphone 150. At least one hollow space 113b, as a sound passage, is defined among the first opening 111a, the second opening 112a, and the third opening 113a. Space 113b enables the first opening 111a, the second opening 112a and the third opening 113a to communicate with each other. In the embodiment shown in FIG. 2A, the end of the third opening distal from the sound passage substantially faces the microphone, thus ambient sound may be received by the first opening 111a and the second opening 112a and be delivered to the microphone 150 via the third opening 113a. In some embodiments, the size of the first opening 111a and the second opening 112a may be substantially different. The substantially different sizes of the first opening 111a and second opening 112a allows collection of different frequency ranges of sound through the openings. An opening with larger size may define a larger resonant space, and acoustic waves passing through the opening and vibrating in the resonant space may slightly change the acoustic wave frequency from a relatively higher frequency range into a relatively lower frequency range after the acoustic wave moving out the resonant spaces. Therefore, acoustic waves passing through the first opening 111a with larger size and resonance in the hollow space 113b may fall into a relatively lower frequency range and be transmitted to the microphone 150. Similarly, acoustic waves passing through the second opening 112a with smaller size and resonance in the hollow space 113b may fall into a relatively higher frequency range and be transmitted to the microphone 150.

As a result, acoustic waves (sound) collected by the first opening 111a and the second opening 112a may fall in different frequency ranges due to the different sizes of the openings 111a and 112a. Such sound may then be conducted to the microphone 150 through the third opening 113a. The microphone 150 may further convert the sound into electronic signals and transmit the electronic signals to the sound delivery device 200 to regenerate the sound and to transmit the sound to the user. The user may distinguish between sound collected from the first opening 111a with larger size and the second opening 112a with lower size by pitches (frequencies) of the sound heard by the user. Therefore, the user may determine the relative position of the sound source based on the pitch of the sound heard by the user. The higher pitch of the heard sound may have been collected from the direction toward where the sound collecting structure has smaller openings on its surface (e.g. the second opening 112a toward direction B). Similarly, the lower pitch of the heard sound may have been collected from the direction toward where the sound collecting structure has large openings on its surface (e.g. the first opening 111a toward direction F).

Figure 2B:
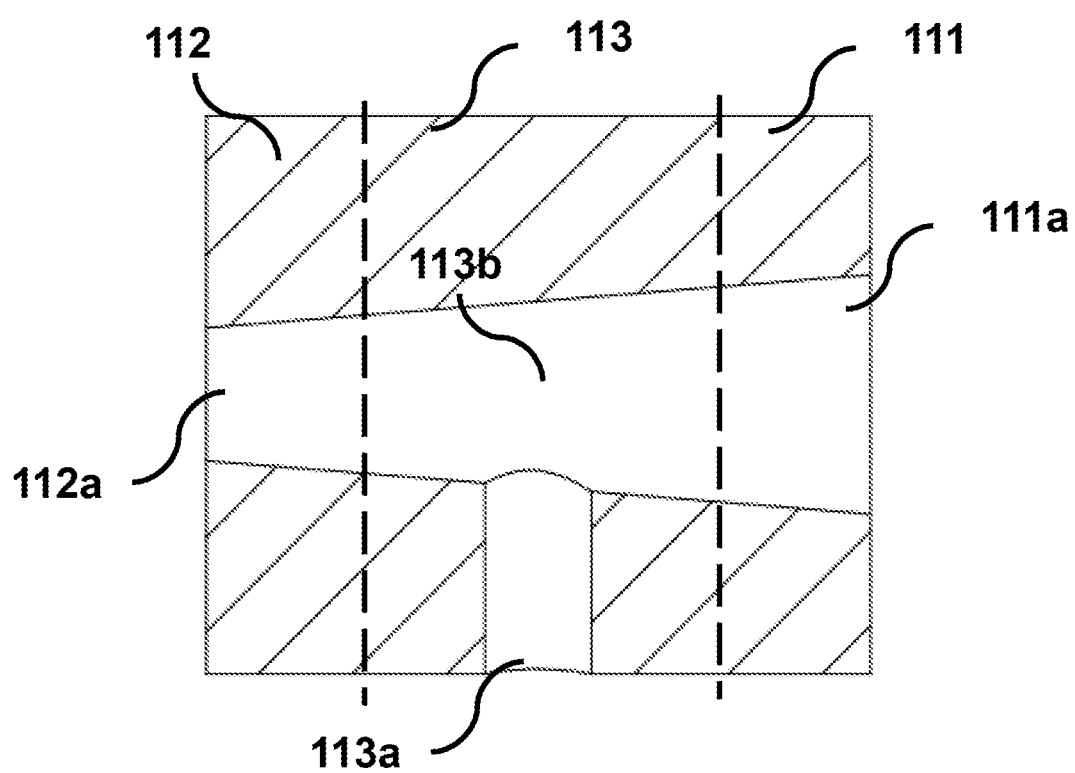
FIG. 2B is a cross-sectional view of the sound collecting structure 110 illustrated in FIG. 2A.

Referring to FIG. 2B, a cross-sectional view of the sound collecting structure 110 in FIG. 2A is disclosed. The sound collecting structure 110 may further comprise a first frustum part 111, a second frustum part 112, and a middle tube 113. The first opening 111a toward direction F may be configured on the surface of the first frustum part 111. Similarly, the second opening 112a toward direction B may be configured on the surface of the second frustum part 112. The ends of the middle tube 113 may be connected to the first frustum part 111 and the second frustum part 112. The hollow space 113b incorporated in the middle tube 113 may further be connected to the first opening 111a toward the first direction F, the second opening 112a toward the second direction B, and the third opening 113a toward the microphone 150. Sound from the first direction F may pass through the first opening 111a, the hollow space 113b and the third opening 113a to be collected by the microphone 150. Similarly, sound from the second direction F may pass through the second opening 112a, the hollow space 113b, and the third opening 113a to be collected by the microphone 150.

Figure 2C:
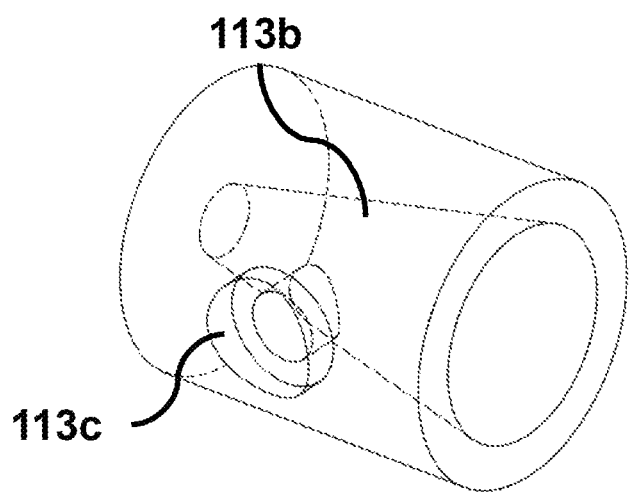
FIG. 2C is another illustration of the sound collecting structure 110.
Figure 2D:
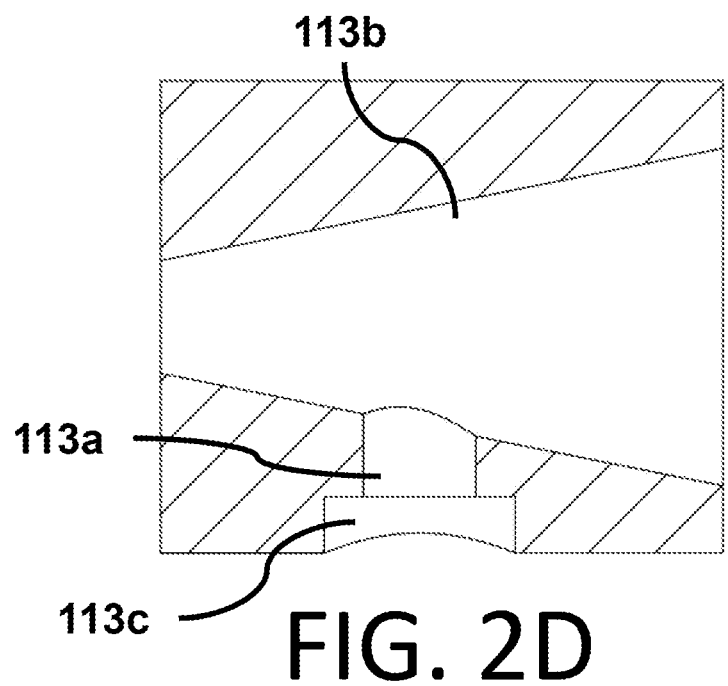
FIG. 2D is a cross-sectional view of the sound collecting structure 110 illustrated in FIG. 2C.

In some embodiments, the microphone 150 may be configured to be placed outside of the sound collecting structure 110. In some embodiments, referring to FIGS. 2C and 2D, the sound collecting structure 110 may further comprise a microphone space 113c to internally accommodate the microphone 150.

Figure 3A:
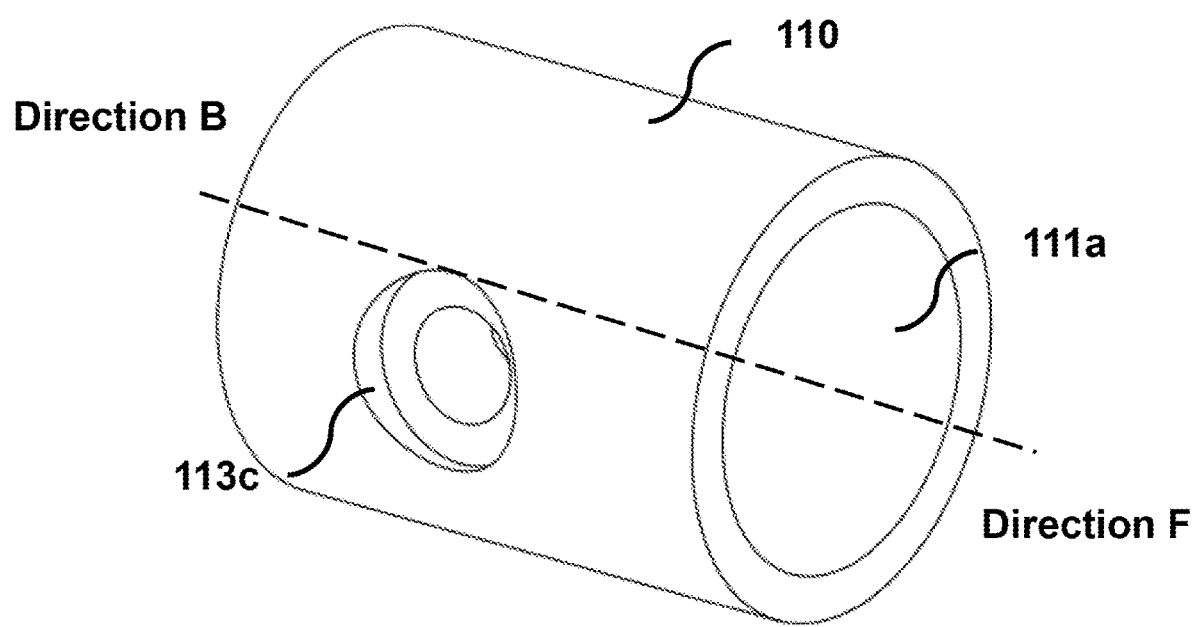
FIG. 3A is another illustration of the sound collecting structure 110.
Figure 3B:
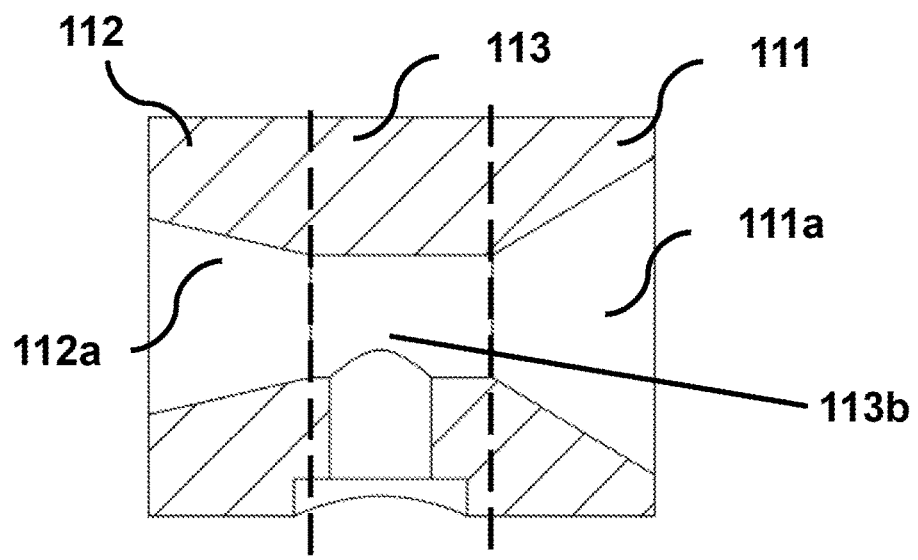
FIGS. 3B and 3C are cross-sectional views of the sound collecting structure 110 illustrated in FIG. 3A.
Figure 3C:
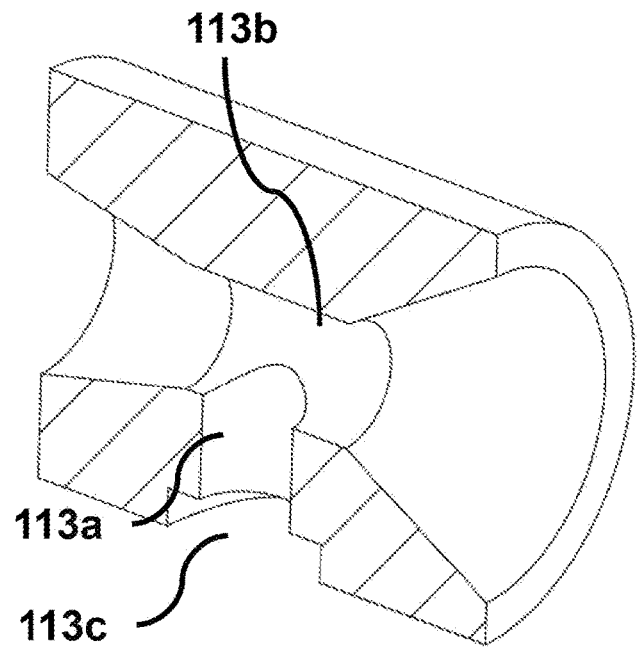

Referring to FIGS. 3A, 3B, and 3C, an illustration of the sound collecting structure 110 is also disclosed. The first opening 111a in the first frustum part 111 and the second opening 112a in the second part 112 may define horn-shaped spaces for facilitating sound collection. Each of the horn-shaped spaces may connect with the hollow space 113b in the middle tube 113 for the sound to be conducted through the hollow space 113b and to be collected by the microphone 150.

Figure 4A:
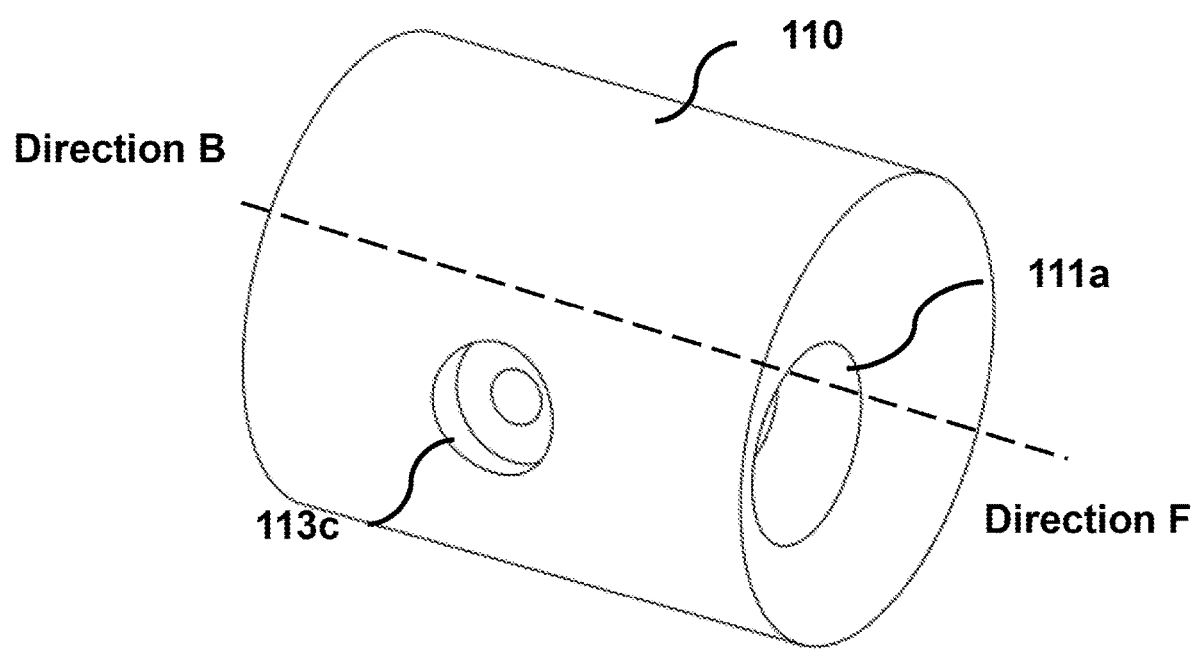
FIG. 4A is another illustration of the sound collecting structure 110.
Figure 4B:
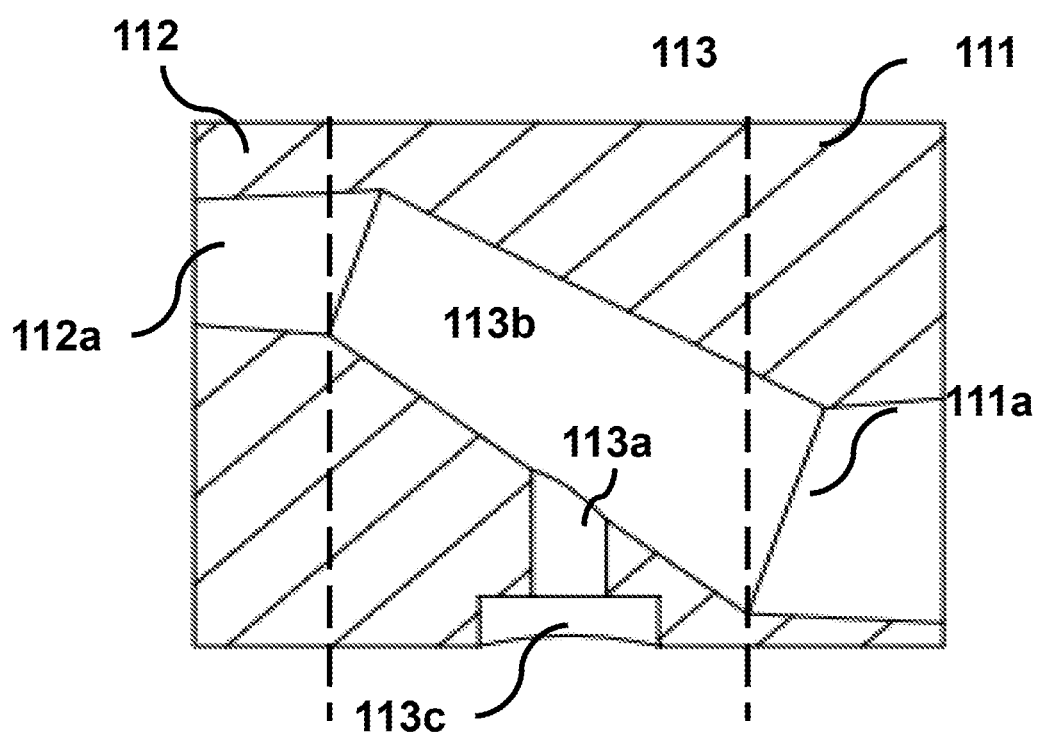
FIGS. 4B and 4C are cross-sectional views of the sound collecting structure 110 illustrated in FIG. 4A.
Figure 4C:
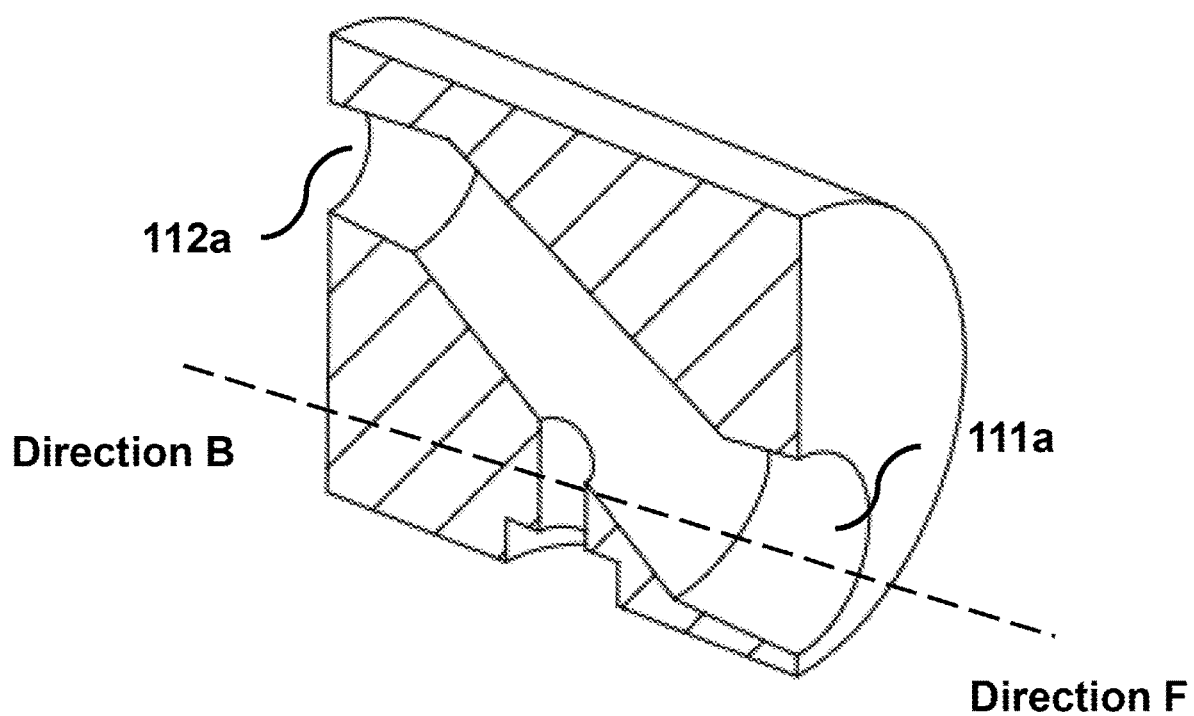

In some embodiments, the first opening 111a, the second opening 112a, and the hollow space 113b may share a common axis. For example, referring to FIGS. 3A, 3B, and 3C, each of the first opening 111a, the second opening 111b, and the hollow space 113b may be located approximately at the center of the first frustum part 111, the second frustum 112, and the middle tube 113. The coaxial configuration of the first opening 111a, the second opening 111b, and the hollow space 113b may shorten the distance of sound conduction in the sound collecting device 110. In some embodiments, referring to FIGS. 4A, 4B, and 4C, the first opening 111a and the second opening 112a may not be coaxial. The first opening 111a toward the first direction F may be located so as to be inclined to one side of the first frustum 111, and the second opening 112a toward the second direction B may be located so as to be inclined to another side of the second frustum 112. The hollow space 113b in the middle tube 113 may still connect the first opening 111a and the second opening 112a.

The shape of the sound collecting structure 110 may vary from substantially cylindrical, substantially conical, substantially cubic, to substantially spherical. Such shape may be irregular in accommodating the whole configuration of the personal audio system 900. Similarly, the respective shapes of the frustum parts 111 and 112, openings 111a and 112a, and hollow space 113b may each vary from cylindrical, conical, cubic, and spherical to irregular shapes in their own right, according to the present disclosure.

Figure 5A:
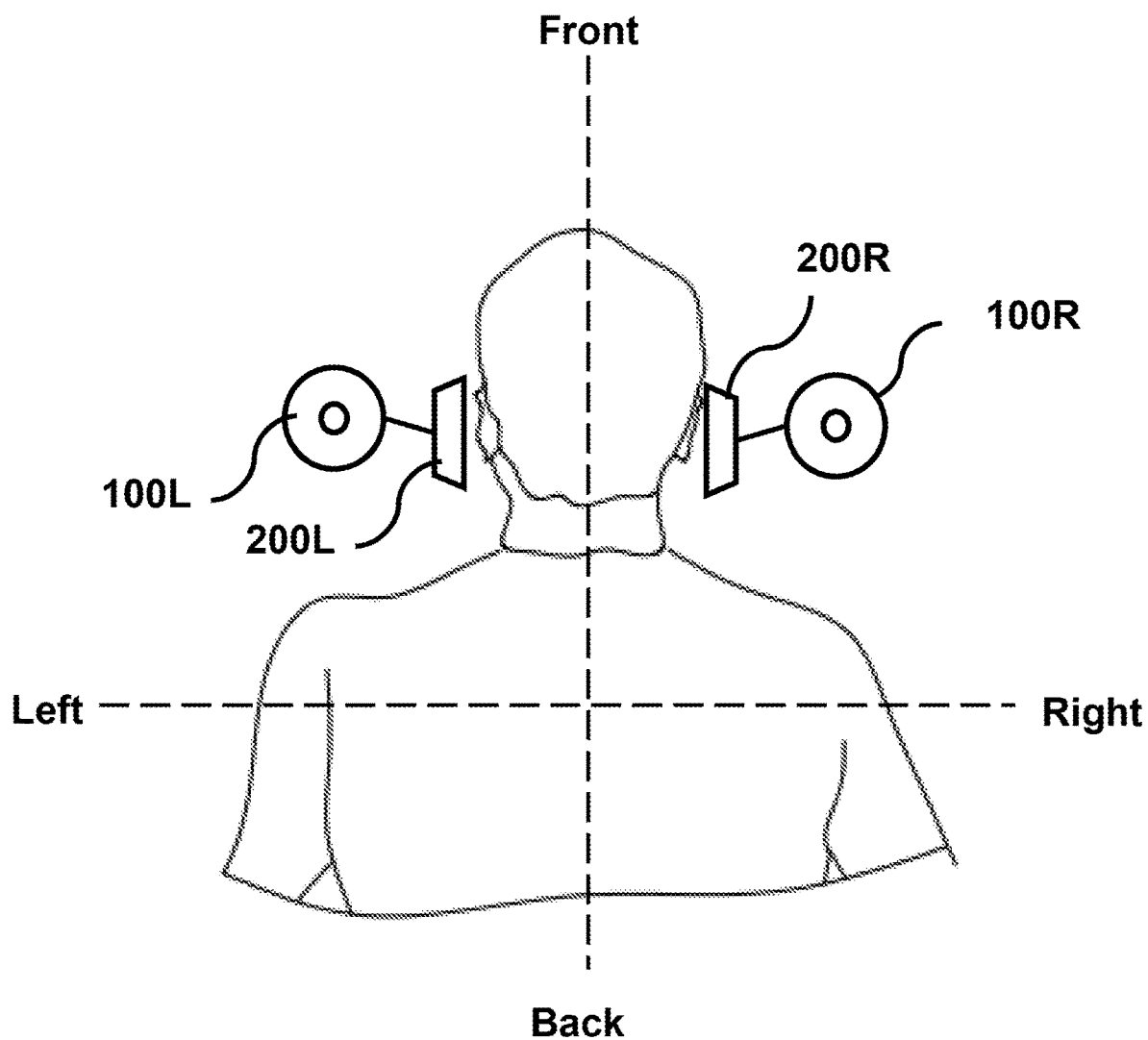
FIG. 5A is an illustration of the determination of a sound source by the personal audio system 900 of the present disclosure.

Referring to FIG. 5A, a scenario for a determination of sound source of a personal audio system 900 with a pair of the sound receivers 100L, 100R and sound delivery device 200L, 200R is disclosed. The personal audio system 900 comprises a left sound receiver 100L, a left sound delivery device 200L, a right sound receiver 100R, and a right sound delivery device 200R. The left sound receiver 100L may be located at the user's left side and be connected to the left sound delivery device 200L which is worn by the user's left ear. The right sound receiver 100R may be located at the user's right side and be connected to the right sound delivery device 200R which is worn by the user's right ear. Each of the sound receivers 100L, 100R may have the sound collecting structures of the present disclosure with openings facing front and rear in relation to the user. Sound from the front and/or rear may be collected by the left sound receivers 100L and/or the right sound receivers 100R. Sound from the user's left side may be collected in major part by the left sound receiver 100L, and transmitted to the left sound delivery device 200L for delivering to the user's left ear. Similarly, sound from the user's right side may be collected in major part by the right sound receiver 100R, and transmitted to the right sound delivery device 200R for delivering to the user's right ear. The sound collecting structure with openings toward the user's front and rear of the left sound receiver 100L and the right 100R, as described in the aforementioned illustration, may enable the user to distinguish sound collected from in front of and from behind the user. Therefore, a coordinate system, in which the user is located at the origin or point zero, with one axis toward the user's left and right sides and the other axis toward the user's front and rear may be formed by the configuration of the personal audio system 900. As a result, locations of sound sources may be primarily categorized based on sounds and slightly different pitches of the sounds heard by the user. Such locations may include left-front quadrant, left-rear quadrant, right-front quadrant, and right-rear quadrant of the coordinate system.

Figure 5B:
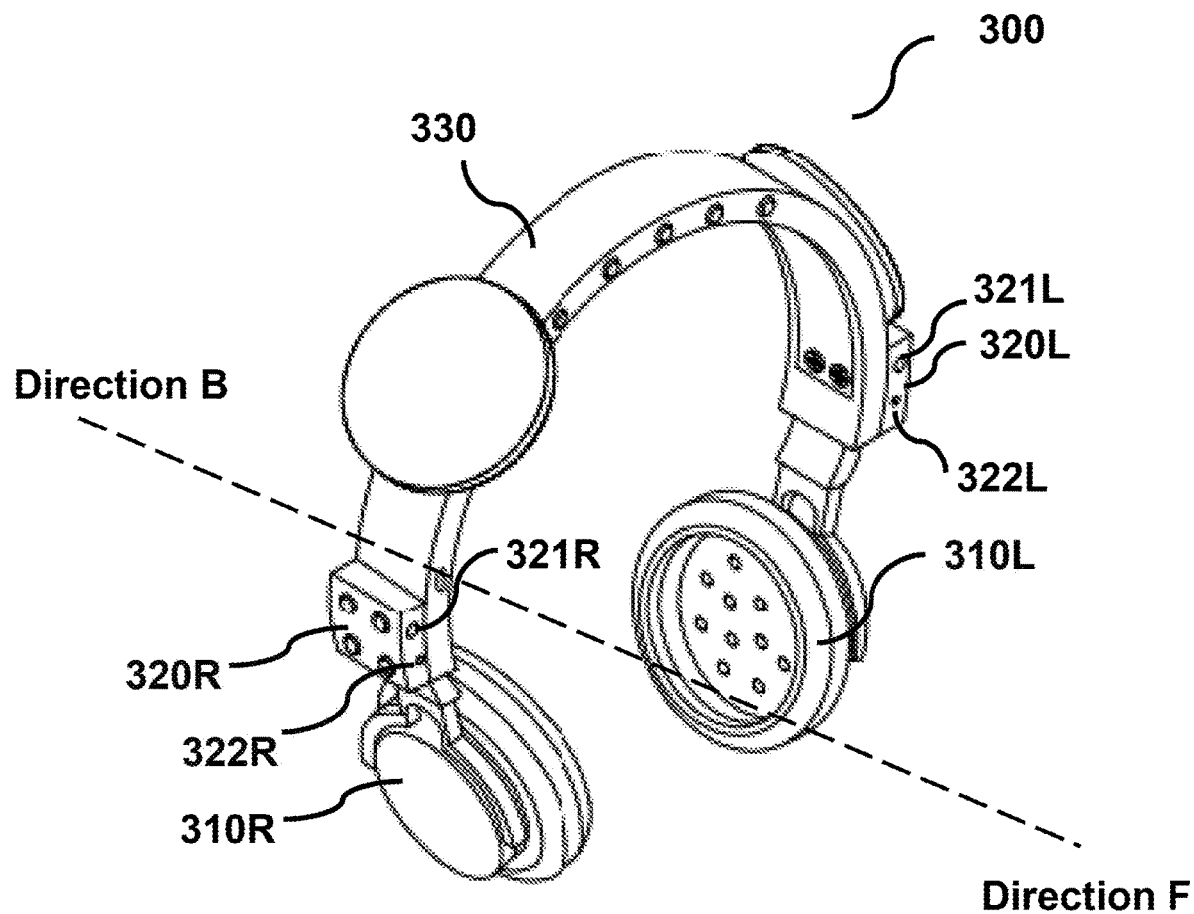
FIG. 5C is a spectacle-frame-type hearing aid as the personal audio system 900 for the scenario of FIG. 5A.
FIG. 5D is a hearing aid comprising a pair of glasses and a helmet as the personal audio system 900 for the scenario of FIG. 5A.

Referring to FIG. 5B, an embodiment of the personal audio system 900 as a hearing aid 300 for the sound source determination scenario in FIG. 5A is disclosed. The hearing aid 300 comprises a left speaker 310L, a right speaker 310R, a left sound collector 320L with a microphone inside, and a right sound collector 320R with a microphone inside. The hearing aid 300 also comprises a connecting part 330 with signal lines implemented inside to connect the left speaker 310L with the microphone inside the left sound collector 320L and the right speaker 310R with the microphone inside the right sound collector 320R. Each of the sound collectors 320L, 320R is attached on the connecting part 330 with a plurality of front openings 321L, 321R, 322L, and 322R toward the front of hearing aid 300. Also a plurality of rear openings (not shown) toward the back of the hearing aid 300 may be located on the surface of the sound collectors 320L, 320R. The size of the front openings may be larger than that of the rear openings. Sound collected by the front openings and the rear openings may fall in different frequency ranges due to different sizes of the openings. The microphones inside of the sound collectors 320L, 320R may convert the collected sound into electronic signals for the speakers 310L, 310R to regenerate the sound to the user's left and right ears. The user may distinguish between sound collected from the larger front openings and sound collected from the smaller rear openings by different pitches (frequencies) of the sound. As depicted in the aforementioned illustration of FIG. 5A, location of sound sources may be primarily categorized, based on sounds and slightly different pitches of the sounds heard by the user's ears, into the same locational segments, that is, left-front quadrant, left-rear quadrant, right-front quadrant, and right-rear quadrant of the coordinate system. The hearing aid may enable the user to determine locations of sound sources.

Figure 5C:
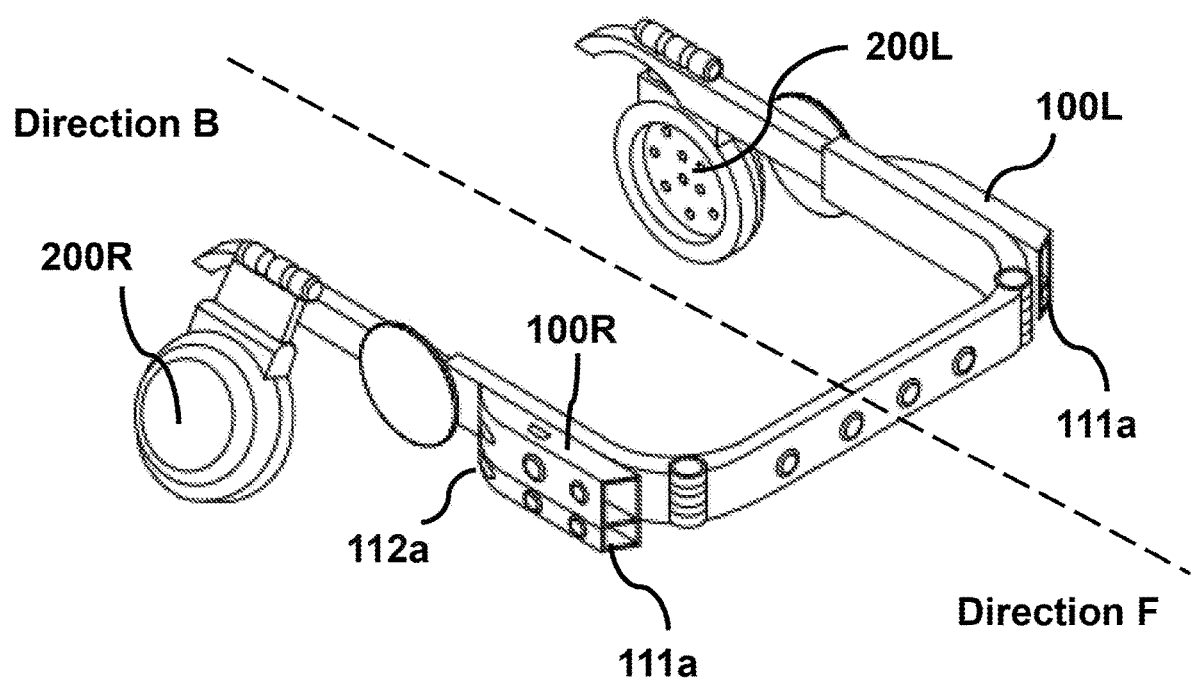
Figure 5D:
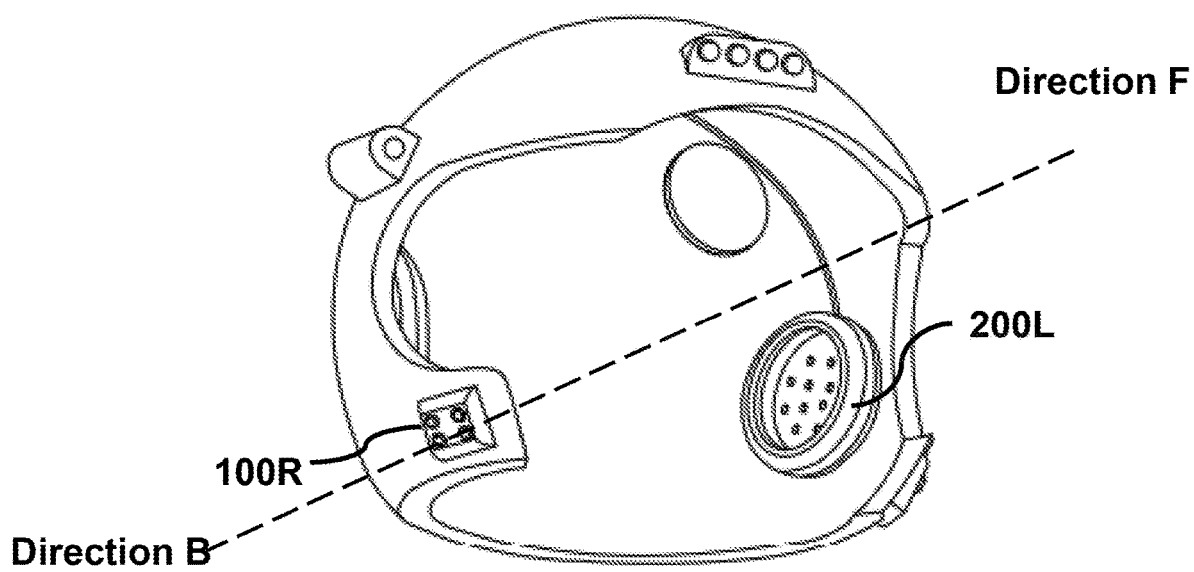

Referring to FIGS. 5C and 5D, in some embodiments, the pair of sound receivers 100L, 100R and the pair of sound delivery devices 200L, 200R may also be accommodated in wearable devices such as a spectacle-frame-type hearing aid in FIG. 5C, a pair of glasses, and a helmet, as in FIG. 5D.

The embodiments mentioned above only specifically describe a few embodiments of the present disclosure in detail, which should not be understood as a limitation to the scope of the present disclosure. It should be noted that, for one of the ordinary skill in the art, variations and improvements could be made based on the present disclosure, which belong to the scope of the present disclosure.

What is claimed is:

1. A sound receiver, comprising:
a sound collecting structure for collecting a sound; and
a microphone for converting the sound to electronic signals,
wherein the sound collecting structure comprises:
at least one first opening located at a first outer surface of the sound collecting structure, the at least one first opening comprising a first section at the first outer surface;
at least one second opening located at a second outer surface of the sound collecting structure, the at least one second opening comprising a second section at the second outer surface, the first outer surface and the second outer surface substantially facing opposite directions, a diameter of the first section being different from a diameter of the second section, and the sound collected via the at least one first opening having a lower frequency range than the sound collected via the at least second opening;
a sound passage located inside the sound collecting structure, the at least one first opening being in communication with the at least one second opening through the sound passage; and
a third opening located at a peripheral surface of the sound collecting structure and being in communication with the sound passage, and the microphone being configured to receive the sound from the third opening.

2. The sound receiver of claim 1, wherein an end of the third opening distal from the sound passage substantially faces the microphone.

3. The sound receiver of claim 1, wherein the microphone is accommodated in a part of the third opening distal from the sound passage.

4. The sound receiver of claim 1, wherein the sound passage is coaxial to the at least one first opening and the at least one second opening.

5. The sound receiver of claim 1, wherein the at least one first opening is non-coaxial to the at least one second opening.

6. A personal audio system for a user to distinguish locations of sound sources, comprising:
at least one sound receiver of claim 1; and
at least one sound delivery device for generating the sound according to the electronic signals,
wherein the microphone of the at least one sound receiver is electrically connected to the at least one sound delivery device.

7. The personal audio system of claim 6, wherein the at least one sound delivery device comprises a signal processing unit and at least one speaker, the signal processing unit receives the electronic signals from the microphone and processes the electronic signals, the at least one speaker generates the sound according to the processed electronic signals.

8. The personal audio system of claim 7, wherein each of the at least one sound receiver and the at least one sound delivery device is accommodated in a housing, the housing is wearable at an ear of the user, and the at least one speaker is arranged to face an external auditory canal of the ear.

9. The personal audio system of claim 7, wherein the at least one sound delivery device further comprises a signal input unit, the signal input unit is configured to receive an input signal and transmit the input signal to the signal processing unit.

10. The personal audio system of claim 9, wherein the signal input unit is a microphone, an audio port or a wireless communication module.

11. The personal audio system of claim 9, wherein the at least one sound delivery device further comprises a signal switch unit, the signal switch unit is configured to select a signal source or a signal mode of the signal input unit and the sound receiver and transmit the selected signal source or signal mode to the signal processing unit.

12. A personal audio system for a user to distinguish locations of sound sources, comprising:
a left sound receiver and a right sound receiver;
a left sound delivery device and a right sound delivery device configured for generating sound according to electronic signals; and
a connecting unit configured to electrically connect the right sound receiver to the right sound delivery device and to electrically connect the left sound receiver to the left sound delivery device,
wherein each of the left sound receiver and the right sound receiver comprises a sound collecting structure for collecting the sound and a microphone for converting the sound to the electronic signals, the sound collecting structure comprises:
at least one first opening located at a first outer surface of the sound collecting structure, the at least one first opening comprising a first section at the first outer surface;
at least one second opening located at a second outer surface of the sound collecting structure, the at least one second opening comprising a second section at the second outer surface, the first outer surface and the second outer surface substantially facing opposite directions, a diameter of the first section being different from a diameter of the second section, and the sound collected via the at least one first opening having a lower frequency range than the sound collected via the at least second opening;
a sound passage located inside the sound collecting structure, the at least one first opening being in communication with the at least one second opening through the sound passage; and
a third opening located at a peripheral surface of the sound collecting structure and being in communication with the sound passage, and the microphone being configured to receive the sound from the third opening.

13. The personal audio system of claim 12, wherein a pair of the left and right sound delivery devices comprises a signal processing unit for receiving the electronic signals from the microphones and processing the electronic signals, the left sound delivery device comprises a left speaker, the right sound delivery device comprises a right speaker, and both of the left speaker and the right speaker generate the sound according to the processed electronic signals.

14. The personal audio system of claim 13, wherein the connecting unit is configured to connect the left speaker to the microphone of the left sound receiver and connect the right speaker to the microphone of the right sound receiver, the left speaker is arranged to face a left external auditory canal of a left ear of the user, and the right speaker is arranged to face a right external auditory canal of a right ear of the user.

15. The personal audio system of claim 13, the pair of sound delivery devices further comprises a signal input unit, the signal input unit is configured to receive an input signal and transmit the input signal to the signal processing unit.

16. The personal audio system of claim 15, wherein the signal input unit is a microphone, an audio port or a wireless communication module.

17. The personal audio system of claim 12, further comprising a housing for accommodating the left sound receiver, the right sound receiver, the left sound delivery device, the right sound delivery device and the connecting unit.

18. The personal audio system of claim 17, wherein the housing is wearable at a head of the user, the right sound receiver is arranged at a right side of the user, the left sound receiver is arranged at a left side of the user, the right sound delivery device is wearable by a right ear of the user, the left sound delivery device is wearable by a left ear of the user, the first openings of both of the left sound receiver and the right sound receiver are configured to face a front direction of the user, and the second openings of both of the left sound receiver and the right sound receiver are configured to face a rear direction of the user.

19. The personal audio system of claim 17, wherein the housing is shaped in a form of a headband, a spectacle frame or a helmet.

* * * * *